(12) United States Patent
Giust et al.

(10) Patent No.: US 11,012,311 B2
(45) Date of Patent: May 18, 2021

(54) SDN-BASED MOBILE COMMUNICATION SYSTEM AND METHOD FOR OPERATING SUCH SYSTEM (71) Applicant: NEC Laboratories Europe GmbH, Heidelberg (DE)

(72) Inventors: Fabio Giust, Cittadella (IT); Marco Liebsch, Heidelberg (DE)

(73) Assignee: NEC LABORATORIES EUROPE GMBH, Heidelberg (DE)

(*) Notice: Subject to any disclaimer, the term of this patent is extended or adjusted under 35 U.S.C. 154(b) by 7 days.

(21) Appl. No.: 16/311,713

(22) PCT Filed: Jun. 21, 2016

(86) PCT No.: PCT/EP2016/064310
§ 371 (c)(1),
(2) Date: Dec. 20, 2018

(87) PCT Pub. No.: WO2017/220132
PCT Pub. Date: Dec. 28, 2017

(65) Prior Publication Data
US 2019/0260641 A1    Aug. 22, 2019

(51) Int. Cl.
*H04L 12/24*    (2006.01)
*H04L 29/08*    (2006.01)

(52) U.S. Cl.
CPC ........ *H04L 41/0893* (2013.01); *H04L 67/141* (2013.01)

(58) Field of Classification Search
CPC .......................... H04L 41/0893; H04L 67/141
See application file for complete search history.

(56) References Cited

U.S. PATENT DOCUMENTS 9,038,151 B1 * 5/2015 Chua ..................... H04L 45/02
726/6
2010/0298004 A1   11/2010 Rune
(Continued)

FOREIGN PATENT DOCUMENTS

WO  WO 2013188665 A1   12/2013
WO  WO 2015004921 A1   1/2015

OTHER PUBLICATIONS

Ezefibe Chukwudi A et al: "Towards virtualization and secured software defined networking for wireless and cellular networks", 2016 IEEE Canadian Conference on Electrical and Computer Engineering (CCECE), IEEE, May 15, 2016 (May 15, 2016), pp. 1-5, XP032989019.
(Continued)

*Primary Examiner* — Joe Chacko
(74) *Attorney, Agent, or Firm* — Leydig, Voit & Mayer, Ltd.

(57) ABSTRACT

A method for operating an SDN-based mobile communication system, which includes a mobile network having a control plane and a data plane, with a network controller being implemented therebetween, includes: providing a control plane function that possesses information from an access network about location and/or proximity of devices and information about rules and/or policies for setting up sessions for the devices; and the network controller, by collaborative operations with the control plane function, selecting one or multiple data plane nodes that are, based on a particular device's request for session establishment, suitable to act as policy enforcement points for enforcing rules in the data plane that are for enabling connectivity for the particular device.

14 Claims, 6 Drawing Sheets

(56) References Cited

U.S. PATENT DOCUMENTS

| | | | |
|---|---|---|---|
| 2011/0167471 A1 | 7/2011 | Riley et al. | |
| 2015/0110095 A1* | 4/2015 | Tan | H04W 40/02 |
| | | | 370/338 |
| 2016/0174198 A1* | 6/2016 | Akiyoshi | H04W 72/04 |
| | | | 370/329 |

OTHER PUBLICATIONS

Ameigeiras Pablo et al: "Link-level access cloud architecture design based on SDN for 5G networks", IEEE Network, vol. 29, No. 2, Mar. 31, 2015 (Mar. 31, 2015), pp. 24-31, XP011576780.
3GPP TR 23.714 V14.0.0 (Jun. 2016), "$3^{rd}$ Generation Partnership Project; Technical Specification Group Services and System Aspects; Study on control and user plane separation of EPC nodes (Release 14)", Jun. 2016, pp. 1-87.
3GPP TS 23.401 V14.1.0 (Sep. 2016), "3rd Generation Partnership Project;Technical Specification Group Services and System Aspects;General Packet Radio Service (GPRS) enhancements for Evolved Universal Terrestrial Radio Access Network (E-UTRAN) access (Release 14)", Sep. 2016, pp. 1-379.
3GPP TR 23.99 V14.0.0 (Dec. 2016), $3^{rd}$ Generation Partnership Project; Technical Specification Group Services and System Aspects; Study on Architecture for Next Generation System (Release 14), Dec. 2016, pp. 1-522.

* cited by examiner

SDN-BASED MOBILE COMMUNICATION SYSTEM AND METHOD FOR OPERATING SUCH SYSTEM

CROSS-REFERENCE TO PRIOR APPLICATIONS

This application is a U.S. National Stage Application under 35 U.S.C. § 371 of International Application No. PCT/EP2016/064310 filed on Jun. 21, 2016. The International Application was published in English on Dec. 28, 2017, as WO 2017/220132 A1 under PCT Article 21(2).

FIELD

The present invention generally relates to a method for operating an SDN-based mobile communication system. Furthermore, the present invention relates to an SDN-based mobile communication system.

BACKGROUND

With the foreseen explosion of user traffic and diversification of communication paradigms—e.g., MTC (Machine Type Communication), V2X (Vehicle-to-X), etc.—current centralized architectures for mobile networks (e.g., the EPC) are prone to pose scalability problems, suboptimal routing, increased overhead and complexity. Many operators and vendors are already looking at improving the traffic distribution in the network, allowing multiple anchor points for user data traffic, bringing internet services closer to the users, at the edge of the network, as well as tailoring the mobility support to the user needs, reducing the associated overhead.

The Technical Report TR 23.799 by 3GPP (for reference, see 3GPP TR 23.799, Study on Architecture for Next generation System, v0.4.0, 2016-04) is one of the most relevant documents to pave the road for a system architecture evolution towards 5G. It collects a number of requirements and key issues that the next generation system shall meet and resolve, along with potential solutions under evaluation.

Different strategies are adopted to enable the transition to the next generation mobile communications architecture and meet associated requirements, such as flexible deployment, scaling, and softwarization of network functions, from which some are listed in the following:

1) Separating the control plane functions from the data plane functions into logically and physically separated entities, with a communication reference point between the two. (With respect to the term 'data plane' it is noted that in the relevant literature for this topic, as well as in the documents produced by different SDOs, the terms 'user plane' and 'data plane' have the same meaning and are indeed used interchangeably. In the context of the present invention this practice will be adopted as well, unless otherwise stated);
2) Virtualizing Control-Plane functions and abstracting the Data-Plane network topology;
3) Utilizing Network Controllers (e.g., SDN controllers) to abstract the network towards the Control-Plane and enabling a clear separation between the Control-Plane functions(s) (application logic) and the network controller (network view);
4) Simplifying the management of the network for future wide variety of device types, mobility- and communication patterns;
5) Enabling isolated network slices. Data-Plane slices are also represented to the Control-Plane as abstracted view, e.g. as topology graph, which need to be mapped to the common and shared physical Data-Plane resources;
6) Enabling better traffic fan-out by shortening the data path between a mobile device and its one or multiple correspondent services;
7) Breaking the current 3GPP APN and PDN connection concepts by serving a mobile device's IP address from distributed—e.g. central, edge, local POP (Point-of-Presence)—correspondent services without mandating traffic to traverse a single mobility anchor (e.g., PDN gateway);
8) Reducing packet overhead and avoid tunnels to forward packets between overlay mobility anchors.

Albeit the 3GPP has already started looking at the problem, introducing a "Study on control and user plane separation of EPC nodes", sometimes referred as CUPS—Control User Planes Separation (for reference, see 3GPP TR 23.714, Study on control and user plane separation of EPC nodes, v0.4.0, 2016-04), they have not yet explored the usage of network controllers and the SDN paradigm to offload some aspects of the user plane configuration from the control plane functions to a network controller.

SUMMARY

An embodiment of the present invention provides a method for operating an SDN-based mobile communication system, which includes a mobile network having a control plane and a data plane, with a network controller being implemented therebetween, that includes: providing a control plane function that possesses information from an access network about location and/or proximity of devices and information about rules and/or policies for setting up sessions for the devices; and the network controller, by collaborative operations with the control plane function, selecting one or multiple data plane nodes that are, based on a particular device's request for session establishment, suitable to act as policy enforcement points for enforcing rules in the data plane that are for enabling connectivity for the particular device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In view of the above, embodiments of the present invention improve and further develop an SDN-based mobile communication system as well as a method for operating an SDN-based mobile communication system in such a way that efficient transport of mobile data traffic is enabled while taking advantage of the SDN paradigm of offloading data plane configuration issues as far as possible from the control plane functions to a network controller.

In accordance with the invention, the aforementioned improvements are accomplished by a method for operating an SDN-based mobile communication system, where the system includes a mobile network including a control plane and a data plane with a network controller being implemented therebetween, the method including:

providing a control plane function that possesses information from the access network about user- or machine-type devices' location and/or proximity as well as information about rules and/or policies required to set up sessions for the devices, by the network controller, by means of collaborative operations with the control plane function, selecting one or multiple data plane nodes that are, based on a particular device's request for session establishment, suitable to act as policy enforcement points for enforcing rules in the data plane that are required to enable connectivity for the particular device.

Furthermore, the above improvements are accomplished by an SDN-based mobile communication system, including:

a mobile network including a control plane and a data plane, a control plane function implemented in the control plane that is configured to hold information from the access network about user- or machine-type devices' location and/ or proximity as well as information about rules and/or policies required to set up sessions for the devices, and a network controller implemented between the control plane and the data plane, wherein the network controller includes an interface for enabling collaborative operation with the control plane function as well as selection means that are configured to use information received from the control plane function for selecting one or multiple data plane nodes that are, based on a particular device's request for session establishment, suitable to act as policy enforcement points for enforcing rules in the data plane that are required to enable connectivity for the particular device.

According to the invention, it has been recognized that the above mentioned improvements can be accomplished by a collaborative approach between a separated control plane function (e.g. an application for mobility support) and a network controller, enabling a distributed creation of data plane rules and selection and/or re-selection of policy enforcement points in the data plane. According to embodiments, the network controller is equipped with selection means that are configured to use information received from a (virtualized) control plane function for selection of and rules enforcement at one or multiple suitable data plane nodes in a physical topology, where the control plane function has no detailed view about the data plane, by collaboration between the control plane function and the network controller. A 'suitable' data plane node should be able to provide the required resources and functions, e.g., tunneling, metering, packet buffering, etc. as requested by the control plane.

Generally, according to embodiments, appropriate selection of policy enforcement points in the data plane is achieved by mapping between a dual-layer topology based on control plane function topology awareness and network control (physical) topology awareness, enabled through appropriate information exchange over a communication interface (i.e., network controller NBI) between the control plane function and the network controller. The present invention can be regarded as an enabler for SDN-based data plane in a legacy mobility control plane (e.g., virtualized EPC) and next generation mobile core (5G).

Embodiments of the present invention have the advantage of removing the PGW bottleneck, enabling distribution of data traffic across multiple gateways and of using GTP-less communication in the data plane. Furthermore, embodiments of the invention enable an SDN-based data plane in a cloud-native, virtualized and SDN-enabled network for mobile communication as well as mobility management in a sliced and Control-/Data-plane separated environment. Still further, embodiments come along with a flexible implementation choice by keeping some Data-Plane control on the Mobility Control-Plane, while offloading some functions to the SDN Controller. Compared to existing alternative options, which generally include higher costs and imply less clean concepts (e.g., exposure of DPNs and physical topology to the Mobility Control-Plane to select a concrete DPN), the present invention does not mandate particular knowledge of specific attributes about DPNs (e.g., DPN load and supported function) at the Mobility Control-Plane.

According to an embodiment, the collaborative operations between the control plane function and the network controller may include the transmission of information related to a device, e.g. mobile terminal that wishes to establish a session with the mobile network, from the control plane function to the network controller. The control plane function may receive this information via signaling when the device transmits its request for session establishment. After the control plane function has passed or exposed the device related information to the network controller, the network controller may select, based on this information, suitable data plane nodes for policy enforcement.

According to an embodiment, based on the device related information (which, like in the above embodiment, may include, but not limited to, device location, required functions supported by the data plane node, e.g. encapsulation, buffering, etc.), the controller plane function may select an abstract data plane node or a group of abstract data plane nodes (where the selection is performed in a topology abstraction at the control plane, i.e. the "abstract data plane nodes" are treated in the abstract topology at the control plane) and may then expose the selected abstract data plane node or group of abstract data plane nodes, e.g. by means of an abstract node identifier or an abstract group identifier, to the network controller. Based on the information about the abstract data plane node or group of abstract data plane nodes the network controller may select suitable data plane nodes for policy enforcement.

With respect to an efficient selection and/or re-selection of an optimal data plane functional entity based on a device's request for session establishment by signaling and collaboration between the control plane function and the network controller, it may be provided that also correspondent service information (e.g. service location, network hosting the service, PDN, data-center hosting the service, required functions supported by the Data-Plane node, e.g. encapsulation, buffering, etc.) is being exposed from the control plane function to the network controller. The network controller may then perform selection of suitable data plane nodes for policy enforcement also on the basis of this correspondent service information.

According to an embodiment, the device related information passed from the control plane function to the network controller may include a location attribute that represents information about the device's location and/or proximity (e.g., access point identifier, geo location, etc.). The control plane function (e.g., mobility support application), which may receive this location attribute via signaling, may then provide information about the device's location to the network controller, e.g. SDN controller, via a network controller northbound interface, which may be realized in different ways:

According to one implementation, the control plane function may provide the location attribute as it is to the network controller. The network controller holds the logic to map the location attribute to a suitable data plane node to enforce the mobility control plane's rules.

According to another implementation, the control plane function may use the location attribute to map the location to a virtual data plane node (e.g., a topological graph node ID, or a virtual node ID) on its abstract view (topology graph) of the data-plane, and may pass the virtual data plane node ID to the network controller. Then, the network controller maps the virtual data plane node ID to a suitable data plane node for policy enforcement.

According to still another implementation, the control plane function may use the location attribute to identify a group of virtual data plane nodes in the abstract data plane topology, and may pass a group identifier, which identifies the selected group of virtual data plane nodes (could identify a data center, network center, a local point-of-presence (PoP), or the like), to the network controller. Then, the network controller maps the group identifier to a suitable data plane node for policy enforcement.

According to an embodiment, based on attributes related to the device's context (including for instance, but not limited to, mobility pattern, preferred communication profile, information about the correspondent service type, required support from data plane functions, etc.) and/or related to the network of the service being used by the device, the control plane function can append additional information when passing the location attribute to the network control, which helps the network controller in the mapping and selection of a suitable data plane node.

In particular, such additional information may include information about the network in the topology from which the device's IP address should be determined/allocated. In this context, the UE's IP address is matching the identified network and is topologically correct in that network, i.e. matching the identified network's address prefix. As a consequence, the transport network will route IP packets, which are destined to the UE's IP address, to the identified network. For instance, the control plane function may identify the network of a local PoP close to the network edge and close to the location identified by the location attribute. Specifically, the additional information can be a network identifier, a network IP address prefix, a data-center identifier or network-center identifier, or an IP address of a node in the network, from which the device's IP address is to be determined. This information can be used by the network controller to select a PEP in the network, where the device's IP address is topologically correct. This ensures that traffic, which is forwarded by default routes, can be processed by the selected PEP in that network.

Furthermore, such additional information may include information about the network of the device's correspondent service, e.g. the network identifier or prefix, in which the service being used by the device is located, or the network which provides the Internet Exchange Point (IXP) to offer internet services to attached devices. Such service location information can be the server's address or identifier, the network hosting the service, PDN hosting the service or the data-center hosting the service, and can include required functions supported by the data plane node, e.g. encapsulation, buffering, etc. This information can be used by the network controller to select a PEP in the network, which is close or local to the correspondent service and ensures, that traffic between the device and a correspondent service can be processed close to the service, e.g. for policy enforcement or metering.

Still further, such additional information may include information about the correspondent service type (e.g., Internet access for web-browsing, voice service, M2M communication, etc.). This information is used to determine whether the data plane node should provide service-specific support (e.g., buffering, data compression, etc.).

Still further, such additional information may include information about the mobility pattern of the mobile device (e.g., static, low speed, high speed, etc.). This information can be used by the network controller to determine the data plane node that potentially leads to the least number of data plane node relocations.

Still further, such additional information may include information about the data plane slice (e.g. a slice name or identifier), to which a rule applies. The network controller may use this slice information to determine the associated resource on the data plane to which the rules apply.

According to an embodiment, the control plan function may be implemented in form of an integrated gateway control function, GW-C, that includes control plane components of a combined Serving Gateway and PDN Gateway, P/S-GW. Insofar, this embodiment provides a mechanism to select one or multiple PEPs for mobile users' data traffic when one single logical mobile gateway (e.g., combined SGW+PGW) is deployed in the control plane of the mobile network.

According to an embodiment, the policy enforcement points may be implemented in a form that they replace Serving Gateway, S-GW, and PDN Gateway, P-GW, components sitting in the data plane.

According to an embodiment, one of the data plane nodes selected to act as policy enforcement points may function as edge policy enforcement point terminating the interface towards the radio or fixed line access node, e.g. in case of an application to EPS, the S1-U interface towards the E-UTRAN elements (i.e. eNodeB). Alternatively, the data plane nodes selected to act as policy enforcement points may function as edge policy enforcement point that is located on the radio or fixed line access node, i.e. the edge policy enforcement point can be the access node itself.

According to an embodiment, the GW-C may determine the edge policy enforcement point (Edge PEP) based on device's location information received via signaling with a mobility management entity, MME, wherein the GW-C resolves the device's location information into an edge policy enforcement point eligible for the device's location according to the topology information maintained on the GW-C.

According to an embodiment, one or more of the data plane nodes selected to act as policy enforcement points may function as root policy enforcement points constituting the forwarding elements under management of the network controller that are closest to respective services requested by the device.

According to an embodiment, the root policy enforcement point (Root PEP) selection/re-selection and configuration may be triggered reactively upon interception of traffic to/from the respective device at the network controller. According to an alternative embodiment, a 'default' Root PEP is selected by pre-provisioning a data plane node with appropriate rules to serve as Root PEP and by configuring the corresponding Edge PEP with rules to deliver/forward traffic from the respective device to that default Root PEP and/or to deliver/forward traffic to the respective device from that default Root PEP (i.e. uplink and downlink configurations).

There are several ways how to design and further develop the teaching of the present invention in an advantageous way. To this end it is to be referred to the following explanation of preferred embodiments of the invention by way of example, illustrated by the drawings. In connection with the explanation of the preferred embodiments of the invention by the aid of the drawings, generally preferred embodiments and further developments of the teaching will be explained.

Figure 1:
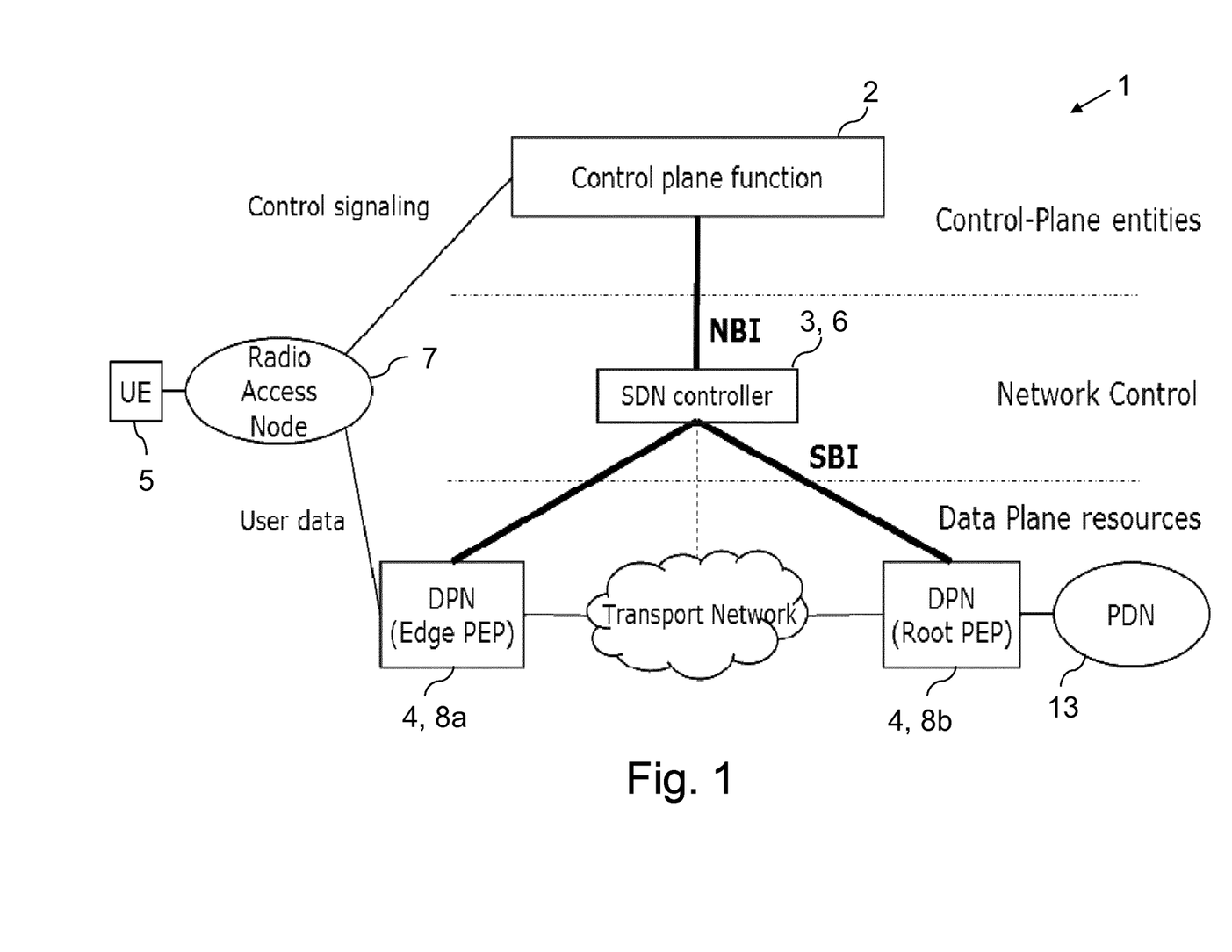
FIG. 1 is a schematic view illustrating separation of Control-Plane functions, Network Control and Data-Plane resources in an SDN-based mobile communication architecture in accordance with embodiments of the present invention.

FIG. 1 illustrates an SDN-based architecture 1 that addresses some of the aspects mentioned above and that solves some of the key issues presented in document 3GPP TR 23.799: "Study on Architecture for Next generation System, v0.4.0, 2016-04". It is noted that in this document the key issues 1) to 6) of the overview presented in the introduction have been identified as potentially tackled by the proposed architecture. Specifically, FIG. 1 depicts an exemplary view of a Control-Plane function 2, which connects and utilizes a network controller 3 to enforce rules in the Data-Plane Nodes (DPNs) 4 to transport mobile data traffic of a UE 5. In connection with embodiments of the present invention, which will be described hereinafter in detail, the concept of network controller 3 is in fact realized through the concepts from the SDN paradigm, and thus, through an SDN controller 6. However, as will be easily appreciated by those skilled in the art, different implementations with physically and logically separated Control-Plane and Data-Plane that do not rely on the SDN concept, but on similar approaches, are also possible.

One of the most relevant issues in a deployment where the Control-Plane is separated from the Data-Plane with an SDN Controller 6 in between is the distribution of relevant information to select suitable Data-Plane nodes 4 and to set up required Data-Plane paths by the enforcement of rules on one or multiple selected Data-Plane nodes 4. While the Control-Plane function 2 holds information about session states, e.g. device status, location information and communication endpoints, the SDN Controller 6 holds network-related information, e.g. physical topology, Data-Plane nodes' 4 supported functions and load. Challenge in such decomposed and distributed architecture is the interplay between the Control-Plane and the SDN Controller 6 to enable the aimed operation per the above list and make the Data-Plane reflect the mobility session states and agreed service levels appropriately.

Embodiments of the present invention leverage the SDN paradigm as an abstraction layer to enable the control plane to operate a distributed and IP-native data plane. In this context, selecting one or multiple DPNs 4 as the Policy Enforcement Points (PEPs) for user traffic plays a crucial role in building the data path. Optionally, the SDN Controller 6 may also connect to transport nodes in between PEPs, e.g. to enable transport SDN in between distributed data centers, as shown by the dotted line in FIG. 1.

Generally, in an architecture with CUPS, Control User Planes Separation, the Control-Plane function 2 may receive information from the access network (in particular, from the radio access node 7) about the proximity of a mobile device 5 (location information, access point identifiers, etc.), as well as about the mobile device's 5 context (mobility pattern, preferred communication profile, information about the correspondent service type, required support from data plane functions, etc.). Although not shown in FIG. 1, it is to be understood that the access node could also be an access node for fixed access (e.g., xDSL). While the Control-Plane function 2 is aware of the rules that need to be enforced in the Data-Plane to enable connectivity for a device, i.e. UE 5 in FIG. 1, and may know about an abstract view of the Data-Plane, e.g. as abstract topology graph, it does not have fully detailed topology and routing information, which belongs to the SDN controller 6 instead.

Since the Control-Plane function 2 has neither detailed view nor direct access to Data-Plane nodes 4 for programming and for the enforcement of Data-Plane rules to serve a mobile device's traffic, the selection of suitable Data-Plane nodes 4 cannot easily be performed on the Control-Plane. This becomes apparent from FIG. 2, which schematically illustrates an exemplary Data-Plane topology 20 (see lower part of FIG. 2) together with a corresponding topology abstraction 21 at the Control-Plane (see upper part of FIG. 2).

Figure 2:
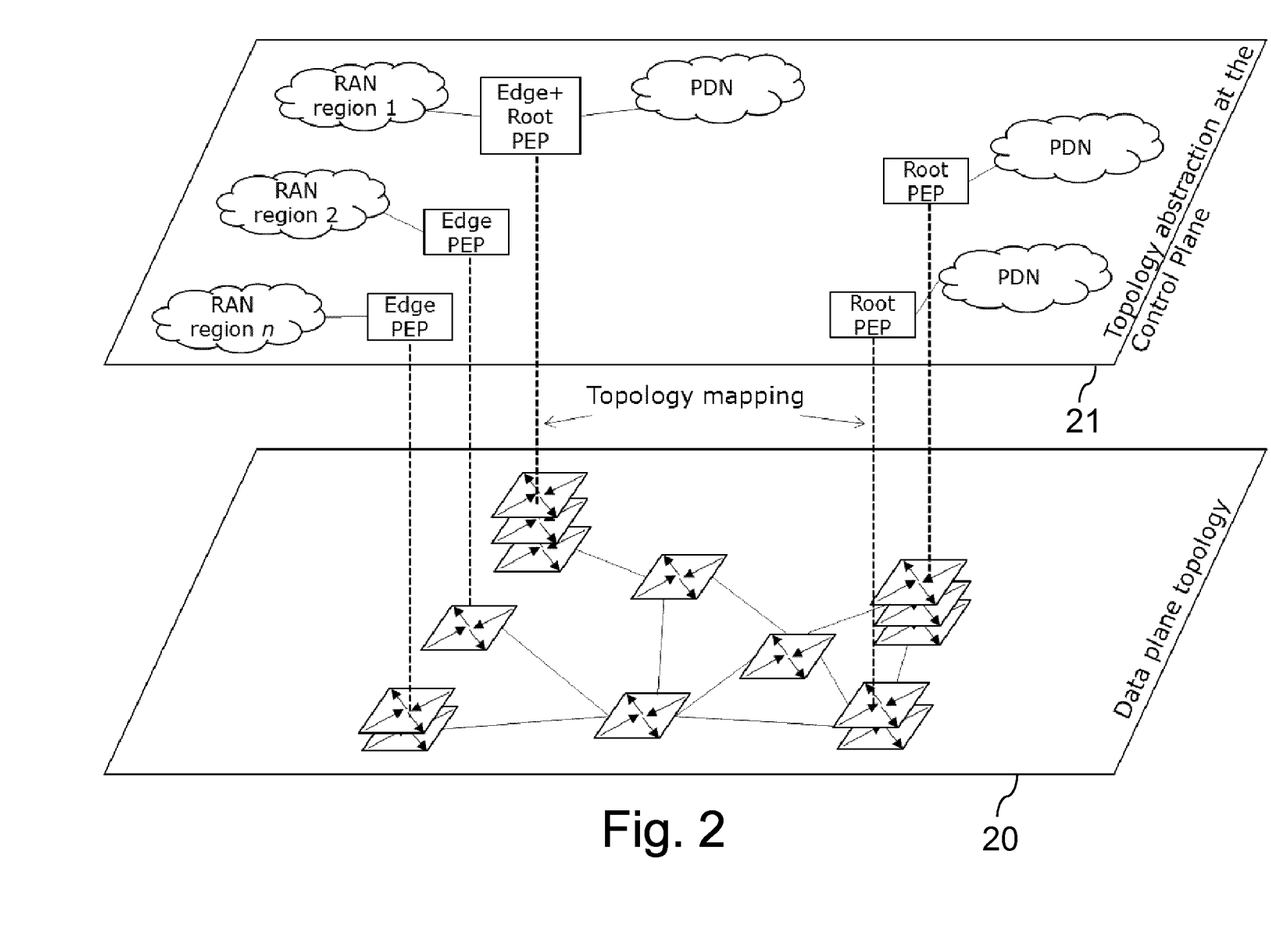
FIG. 2 is an abstract view of a Data-Plane from the viewpoint of a mobility Control-Plane of an SDN-based mobile communication architecture in accordance with embodiments of the present invention.

On the other hand, the SDN controller 6 does not possess the rules and policies information required to set up an appropriate session for the mobile device 5.

In case of a sliced network, which isolates Data-Plane resources associated with different network slices, Control-Plane functions 2 know from session information to which Data-Plane slice a particular rule applies, but is not aware to which physical Data-Plane nodes 4 the rules apply. Even though the SDN Controller 6 has the detailed view about the physical Data-Plane and may know which Data-Plane slice is realized by which Data-Plane resources, it does not have information about the association between a subscriber/data session and a Data-Plane network slice.

Therefore, in accordance with embodiments of the present invention the selection of suitable Data-Plane node(s) 4 is performed in a collaborative way between the Control-Plane function 2 and the SDN controller 6, provided appropriate information is exchanged between them. Generally, embodiments of the present invention enable selection and configuration of rules in suitable DPN(s) 4 in a Control-/Data-Plane separated architecture and treat these DPNs 4 as policy enforcement points 8 to provide connectivity for a mobile device 5. To this end, embodiments of the invention provide an appropriate interfacing mechanism between the Control-Plane function 2 and the SDN controller 8 to enable consistent selection of a suitable Data-Plane node 4, as will be described in more detail below.

When considering applications to current architecture for mobile networks, e.g., the EPS for an LTE network as per 3GPP TS 23.401, embodiments of the invention enable the simultaneous usage of multiple PGW's user plane elements under the control of a single PGW control instance.

Figure 3:
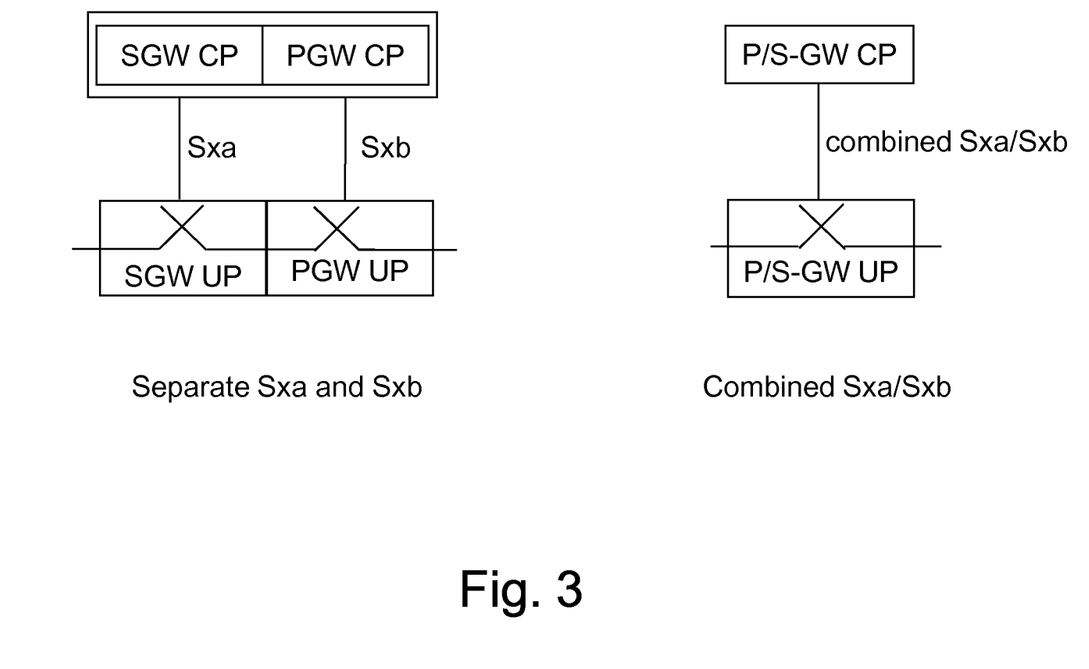
FIG. 3 is a diagram illustrating handling of Control-Plane and User-Plane interfacing with combined SGW/PGW in accordance with embodiments of the present invention.

Specifically, according to an embodiment of the invention the architecture re-uses part of the functional split for combined S/P-GW proposed in document 3GPP TR 23.714, Study on control and user plane separation of EPC nodes, v0.4.0, 2016-04, which consists in first merging the SGW and PGW together, and then splitting the combined entity into control and user plane components. The split proposed in the above cited 3GPP TR 23.714, from which section 6.1, in particular subsection 6.1.2, is incorporated herein by way of reference, is illustrated in FIG. 3, together with an embodiment of an appropriate interfacing mechanism. The control plane, CP, entities are depicted in the upper part of FIG. 3, while the user plane, UP, entities are depicted in the lower part of FIG. 3.

Figure 4:
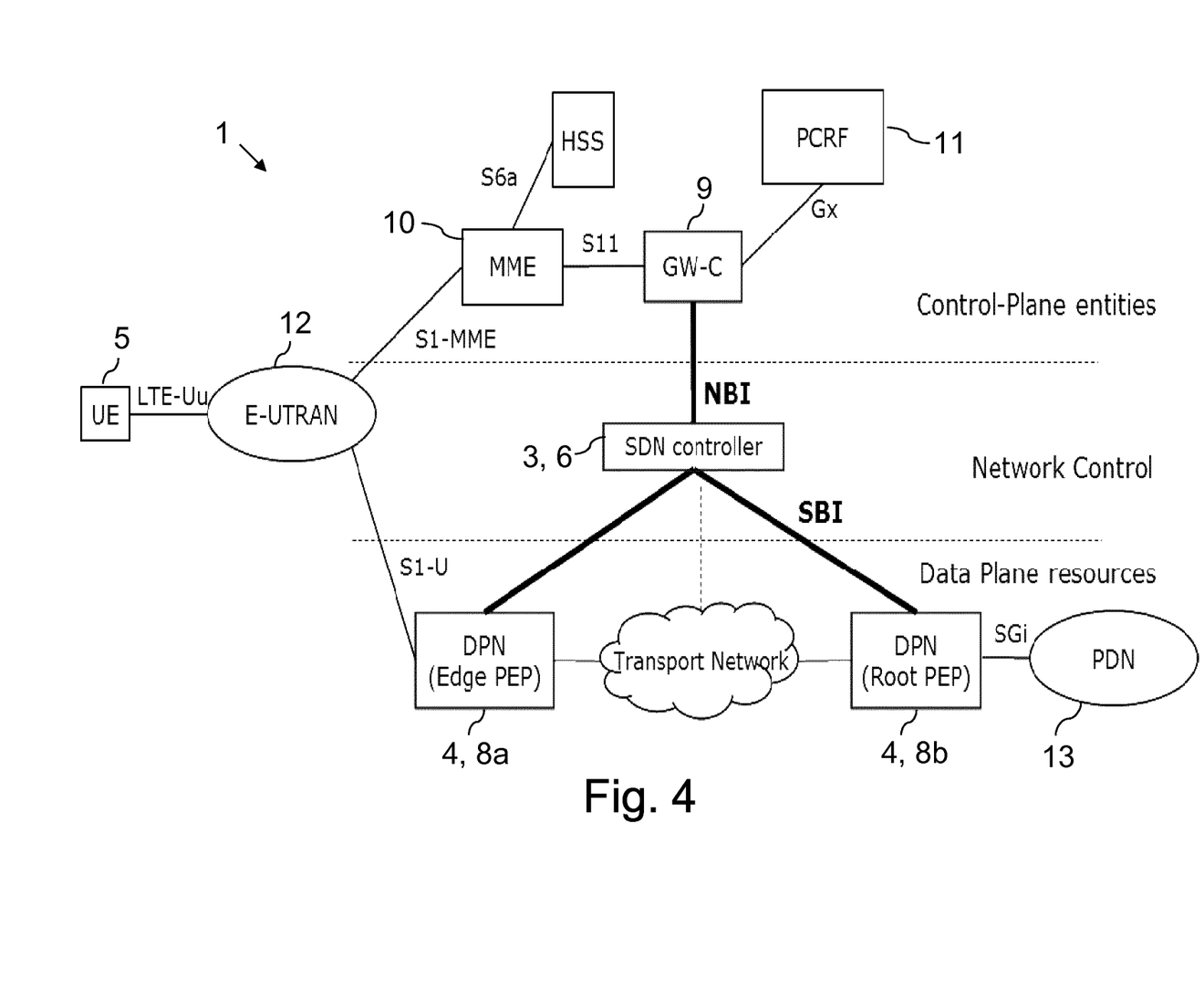
FIG. 4 is a schematic view illustrating an SDN-based CUPS, Control User Planes Separation, architecture in accordance with embodiments of the present invention.

According to embodiments of the invention, an integrated gateway control function (hereinafter briefly denoted GW-C) will be introduced, which reflects the P/S-GW CP components of FIG. 3. As shown in FIG. 4, the GW-C 9 is responsible for terminating the S11 interface towards the MME (Mobility Management Entity) 10, as well as the Gx interface towards the PCRF (Policy and Charging Rules Function) 11.

As shown in the embodiment of FIG. 4, the SGW and PGW components sitting in the data plane are replaced by Policy Enforcement Points (PEPs) 8. PEPs 8 are Data-plane nodes 4 (i.e., forwarding elements like switches and routers) which are able to enforce a given policy (QoS, NAT, etc.) to packets on a flow basis. There are two types of PEPs 8: Edge PEPs 8a and Root PEPs 8b. They are both programmed by the SDN controller 6 using an SBI protocol (for instance, but not limited to, OpenFlow).

As illustrated in FIG. 4, an Edge PEP 8a terminates the S1-U interface towards the E-UTRAN elements 12 (e.g., eNodeB). The Edge PEP 8a is GTP-U capable to maintain backward compatibility with eNBs, therefore emulating part of the SGW data plane functionalities.

A Root PEP 8b is the closest forwarding element to the requested service, under the management scope of the SDN controller 6 (SDN domain). Edge and root PEPs 8a, 8b might be co-located to enable local breakout deployments.

As shown in FIG. 4, there is one Edge PEP 8a for a specific access link to the UE 5, whereas (although not explicitly shown in FIG. 4) there can be multiple Root PEPs 8b according to traffic patterns and requested services.

The Sxa and Sxb reference points (or the combination of the two), as per the 3GPP's proposal, are replaced by the concatenation of the NBI and SBI protocols, with the mediation of the SDN controller 6.

As depicted in FIG. 2, the SDN controller 6 of FIG. 4 maintains the topology of the switching elements in the network and corresponding links. The GW-C 9 maintains a logical topology representing the eligible Edge and Root PEPs 8a, 8b. A cluster of DPNs in the SDN-C scope can be resolved as a single PEP in the GW-U scope. The mapping between a logical Edge PEP 8a and the device that implements the PEP functionalities is transparent to the GW-C 9 and operated by the SDN controller 6.

Figure 5:
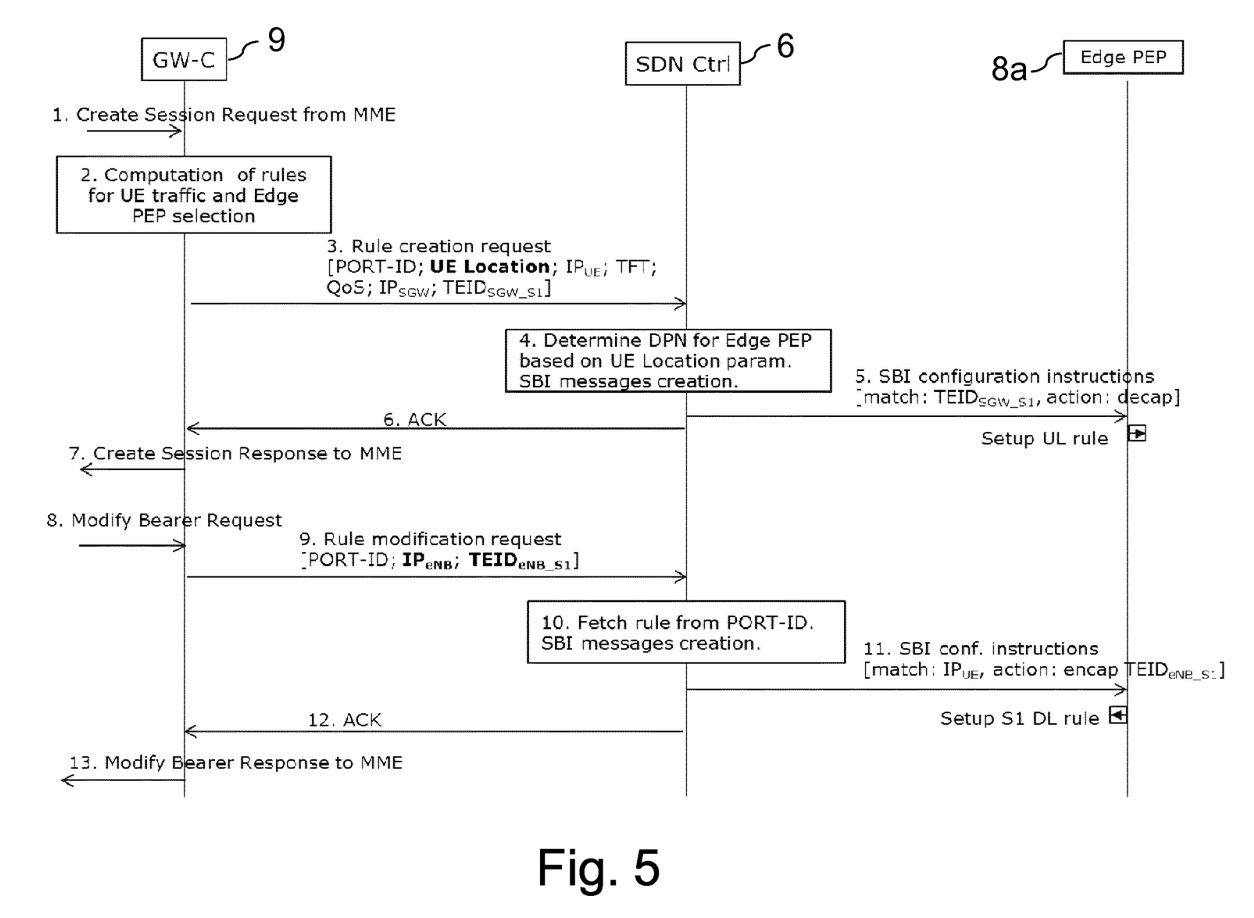
FIG. 5 is a diagram illustrating an Edge PEP selection mechanism in accordance with embodiments of the present invention.

Turning now to FIG. 5, this figure illustrates an Edge PEP 8a selection procedure in accordance with an embodiment of the present invention.

In the current EPC operations, an SGW is primarily selected based on network topology, as well as on other criteria like load balancing. In accordance with embodiments of the present invention such selection can be mapped to an Edge PEP 8a selection, so it is necessary to perform the appropriate translations from the 3GPP semantic to the one used for the NBI protocol.

In order to do so, the following logical steps may be taken into account:
1) The MME 10 is the entity in the EPC that signals the relevant events to the selected SGW. The signaling target is therefore implicitly revealing the SGW selection process.
2) Since, in the proposed architecture, there might be only one logical GW-C 9 terminating the signaling with the MME 10, the SGW selection logic is somehow lost, as the GW-C 9 has to determine the Edge PEP 8a by itself.
3) The selection done by the GW-C 9 should be primarily assisted by UE 5 location information conveyed by the signaling with the MME 10. Other UE 5 attributes related to the device's context (e.g., mobility pattern, communication profile, etc.) can be used in the selection process as well.
4) Based on the topology maintained by the GW-C 9, the GW-C 9 resolves the UE 5 location into the Edge PEP 8a eligible for that location.
5) The information about the Edge PEP 8a is passed to the SDN controller 6 through the NBI, in a form that allows the SDN controller 6 to map the Edge PEP 8a indicated by the GW-C 9 into the cluster of DPNs that may serve to the purpose. This information is hence specified as an information element in the SBI protocol. This element might have different names, in this example let it be named the Regional ID (RID).
6) Based on the RID, the SDN controller 6 determines the DPN cluster, and picks the most appropriate DPN out of the cluster based on internal metrics, e.g., path optimization, load balancing, or the like.

As already mentioned above, FIG. 5 illustrates an embodiment of the present invention that relates to a procedure of Edge PEP 8a selection that is integrated in the EPC. According to this embodiment, the procedure includes the following steps, where the numbering of the steps follows the indication given in the figure (although, as will be easily appreciated by those skilled in the art, certain steps may be executed in a different sequence than the one described below, or may be executed in a different way or may even be omitted):

1. Upon UE 5 attachment, the MME 10 forwards a Create Session Request message to the GW-C 9, including the location of the UE 5 at eNB granularity, through the E-UTRAN Cell Global ID (ECGI) parameter.

2. Based on subscriber information, requested PDN 13 and TFT for the default bearer, the GW-C 9 computes the rule(s) to handle the UE's 5 traffic within the mobile network. The rules are associated to a key called PORT-ID. They contain the treatment that data traffic should undergo within the mobile network, based on different properties like en-/decapsulation, NAT, QoS class, etc. From the ECGI parameter, the GW-C 9 selects the Edge PEP 8a, i.e., it computes the SGW's IP address and TEID used in the uplink direction of S1-U interface, to be bound to the traffic rules for the decapsulation action. In addition, the GW-C 9 allocates for the UE 5 an IPv4 address (or IPv6 prefix) topologically valid in the network where the Edge PEP 8a sits.

3. The traffic rule is communicated to the SDN controller 6 via the NBI, along with the RID based on the ECGI. The RID is the parameter that identifies the Edge PEP 8a as per the topology map maintained at the GW-C 9.

4. The SDN controller 6 derives an appropriate forwarding element (DPN) 4 to serve as Edge PEP 8a, based on the RID and SGW's IP address. Optionally, the SDN-C might consider the UE's 5 IP address (indicated in the traffic rules) for the DPN selection. The SDN controller 6 then translates the traffic rule into SBI commands to program the edge PEP 8a.

5. The DPN 4 is programmed by the SDN controller 6 with the appropriate traffic rule for uplink traffic, that is, indicating to decapsulate the packets received from the RAN that carry the specified TEID.
6. The SDN controller 6 acknowledges the rule creation request to the GW-C 9.
7. The GW-C 9 replies to the MME 10 with the appropriate message, i.e., Create Session Response.
8. Legacy EPS operations are carried out among the MME 10, eNB 12 and UE 5, resulting in the UE 5 RRC configuration, as well as the configuration of the eNB 12 with the corresponding traffic rules for uplink (SGW's IP address and TEID) and downlink (eNB's IP address and TEID). The MME 10 sends the eNB's 12 IP address and TEID for downlink traffic to the GW-C 9.
9. The GW-C 9 appends the eNB's 12 IP address and the downlink S1 TEID to the rules for the UE 5 traffic. Such parameters are sent to the SDN controller 6.
10. The SDN controller 6 updates its rule description and prepares the instructions for the DPN 4 acting as Edge PEP 8a.
11. The DPN 4 is programmed in order to encapsulate with the appropriate eNB's 12 TEID and IP address the traffic matching the UE's 5 IP address as destination address.
12. An acknowledgement is sent by the SDN controller 6 to the GW-C 9 to conclude the Edge PEP 8a configuration.
13. The GW-C 9 concludes the interaction with the MME 10.

Figure 6:
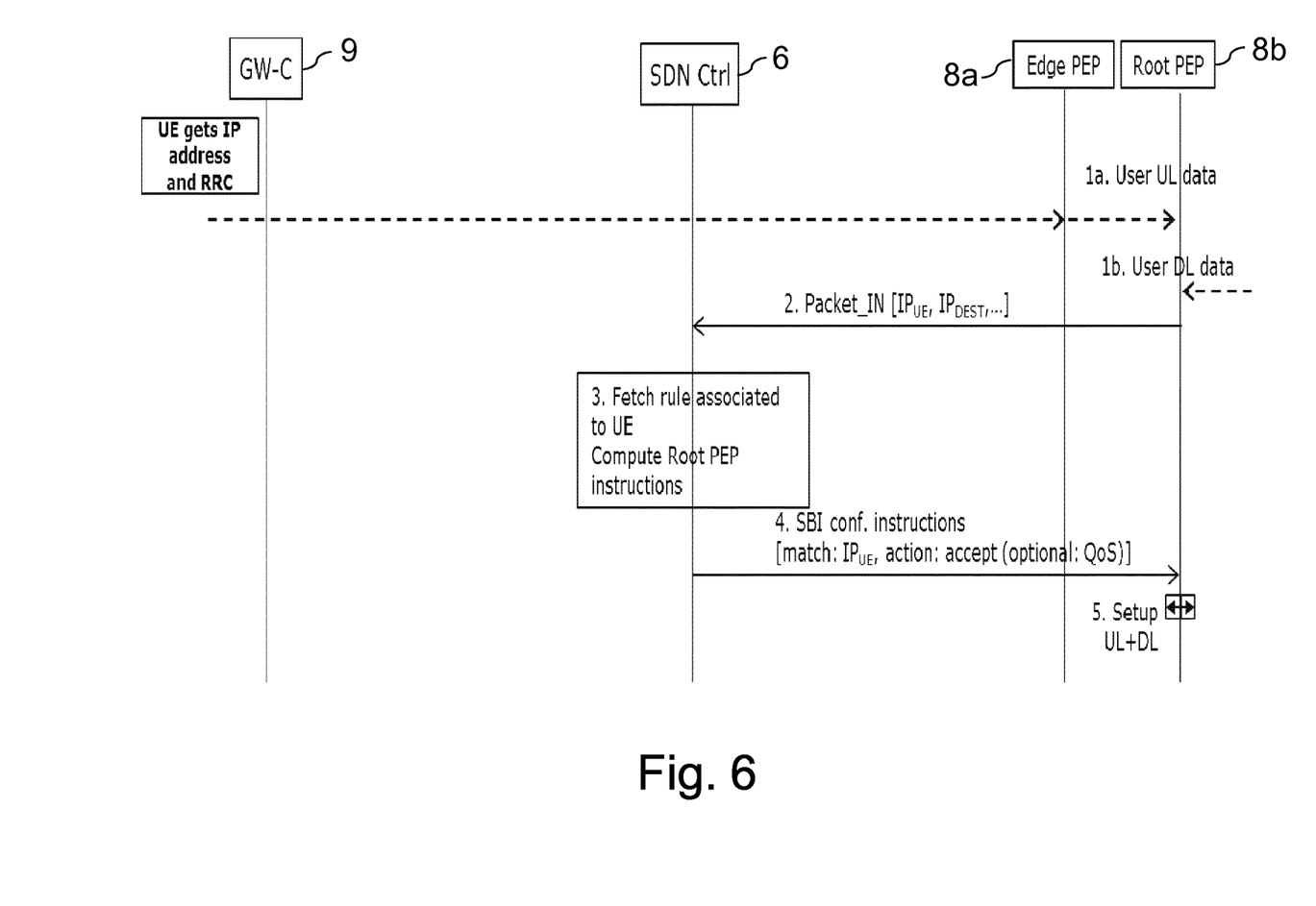
FIG. 6 is a diagram illustrating a Root PEP configuration mechanism in accordance with embodiments of the present invention.

Turning now to FIG. 6, this figure illustrates a Root PEP 8b configuration procedure in accordance with an embodiment of the present invention. According to this embodiment the IP native packet core builds on substantial differences from the EPC's S5 interface between the SGW and the PGW, which lead to the following considerations:

There is no GTP tunneling in the data path from an Edge PEP 8a and a Root PEP 8b. Instead, standard IP routing might be used to deliver packets in the transport links between them. Furthermore, multiple Root PEPs 8b might serve a user for the same PDN 13. Operation flows to configure a Root PEP 8b (as shown in FIG. 4) might be implemented as follows (wherein the numbering of the steps follows the indication given in the figure and wherein again, as will be easily appreciated by those skilled in the art, certain steps may be executed in a different sequence than the one described below, or may be executed in a different way or may even be omitted):

1. Data traffic generated by or addressed to the UE 5, eventually hits a DPN 4 eligible as Root PEP 8b.
    a. Once the UE 5 finalizes the RRC configuration, it can send uplink traffic. User packets are routed by an Edge PEP 8a towards destination and are eventually intercepted by a DPN 4 with no default rule, or
    b. Downlink packets destined to the UE 5 are attracted to a DPN 4 with no downlink rule for the UE 5.
2. The DPN 4, using SDN mechanisms, e.g., Packet_IN message in OpenFlow, notifies the SDN controller 6, conveying the packet's header(s) for matching (e.g., against the packet header's 5-tuple).
3. The SDN controller 6 looks up a rule definition for the UE 5. Based on the rule(s), the SDN controller 6 derives the Root PEP 8b instructions. If more rules apply, that with the most appropriate match is selected. If no rule applies, the SDN controller 6 discards the request.
4. The SDN controller 6 programs the DPN 4.
5. The DPN 4 installs the policies to serve as Root PEP 8b.

According to the embodiments of the present invention described above, data structures and functionalities may basically be organized as follows:

With respect to GW-U and logical PEPs topology, consider that E-UTRAN is divided into regions, with each region being under the same edge PEP 8a responsibility. Beyond location, additional metrics might be taken into account. For instance, if a user mobility pattern is known (e.g., trajectory of a train), a region can be created in order to minimize the inter-Edge PEP 8a handover.

With respect to bearer to flow rules mapping at the GW-U, it may be provided that EPC control entities, like the MME 10 and PCRF 11, refer to policies as grouped into bearers. Bearers are associated to APNs. The GW-C 9 needs to map such bearers to flow rules, which are identified by a key, e.g. called PORT-ID (cf. step 2 of FIG. 5). The PORT-ID enables to quickly look up a forwarding descriptor, associating traffic selectors to properties for flows.

On the other hand, the SDN controller 6 may be configured to maintain the topology of the network in terms of forwarding elements and links and may map PEPs sites into devices. Furthermore, the SDN controller 6 may translate the result of a PORT-ID lookup into SBI instructions. Still further, the SDN controller 6 may be configured to maintain a list of rules enforced to network devices. This list should be realized in such a way to fetch quickly the rules associated to a user, even when these rules are applied to multiple DPNs 4.

LIST OF ABBREVIATIONS

| | |
|---|---|
| APN | Access Point Name |
| DPN | Data Plane Node |
| eNB | Evolved NodeB |
| EPC | Evolved Packet Core |
| EPS | Evolved Packet System |
| GTP | GPRS Tunneling Protocol |
| HSS | Home Subscriber Server |
| IP | Internet Protocol |
| ECGI | E-UTRAN Cell Global Identifier |
| LTE | Long Term Evolution |
| MME | Mobility Management Entity |
| NBI | North-bound Interface |
| PCRF | Policy Control Rule Function |
| PEP | Policy Enforcement Point |
| PDN | Packet Data Network |
| PGW | PDN Gateway |
| QoS | Quality of Service |
| SBI | South-bound Interface |
| SDN | Software Defined Networking |
| SGW | Serving Gateway |
| TEID | Tunnel Endpoint Identifier |
| TFT | Traffic Flow Template |
| UE | User Equipment |

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating an SDN-based mobile communication system, the method comprising:
   providing a control plane function that possesses information from an access network about location and/or proximity of devices and information about rules and/or policies for setting up sessions for the devices, wherein the system comprises a mobile network comprising the control plane and a data plane, with a network controller being implemented between the control plane and the data plane;
   upon a particular device's request for session establishment, receiving, via signaling and by the control plane, device related information directly from the access network;
   based on the device related information that is received directly from the access network, performing, by the control plane, selection of an abstract data plane node or a group of abstract data plane nodes; and
   providing, by the control plane, the selected abstract data plane node or the selected group of abstract data plane nodes to the network controller, wherein the network controller selects one or multiple data plane nodes that are suitable to act as policy enforcement points for enforcing rules in the data plane that are for enabling connectivity for the particular device based on the particular device's request for session establishment and the selected abstract data plane node or the selected group of abstract data plane nodes.

2. The method according to claim 1, wherein the device related information includes a location attribute that represents information about the location and/or the proximity of a corresponding device.

3. The method according to claim 2, wherein the network controller maps the location attribute to the suitable data plane nodes for policy enforcement.

4. The method according to claim 2, further comprising:
   using, by the control plane, the location attribute to map the location to a virtual data plane node on the control plane function's abstract view of the data plane; and
   passing an identifier of the virtual data plane node to the network controller, wherein the network controller maps the identifier to the suitable data plane node for policy enforcement.

5. The method according to claim 2, further comprising:
   using, by the control plane, the location attribute to identify a group of virtual data plane nodes on the control plane function's abstract view of the data plane; and
   passing, by the control plane, a group identifier, which identifies the selected group of virtual data plane nodes, to the network controller, wherein the network controller maps the group identifier to the suitable data plane node for policy enforcement.

6. The method according to claim 1, wherein the device related information includes information related to context and/or information related to the network of the service being used by a device.

7. The method according to claim 1, wherein the control plane function is implemented as an integrated gateway control function (GW-C), and the control plane comprises a combined Serving Gateway and PDN Gateway.

8. The method according to claim 1, wherein the policy enforcement points are implemented to replace Serving Gateway and PDN Gateway components sitting in the data plane.

9. The method according to claim 1, wherein one of the data plane nodes selected to act as the policy enforcement points functions as an edge policy enforcement point terminating an interface towards a radio or a fixed line access node.

10. The method according to claim 1, wherein one of the data plane nodes selected to act as the policy enforcement points functions as an edge policy enforcement point being located on a radio or a fixed line access node.

11. The method according to claim 7, wherein the GW-C determines an edge policy enforcement point based on a device's location information received via signaling with a mobility management entity, wherein the GW-C resolves the device's location information into the edge policy enforcement point eligible for the device's location according to topology information maintained on the GW-C.

12. The method according to claim 1, wherein the one or multiple data plane nodes selected to act as the policy enforcement points function as root policy enforcement points comprising forwarding elements under management of the network controller that are closest to respective services requested by the particular device.

13. The method according to claim 1, wherein root policy enforcement point selection and configuration is triggered reactively upon interception of traffic to and/or from the respective device at the network controller, or
   wherein a default root policy enforcement point is selected by pre-provisioning a data plane node with appropriate rules to serve as the root policy enforcement point and by configuring an edge policy enforcement point with rules to deliver traffic to the respective device from the default root policy enforcement point and/or forward traffic from the respective device through the default root policy enforcement point.

14. A SDN-based mobile communication system, the system comprising:
   a mobile network comprising a control plane and a data plane;
   the control plane that implements a control plane function, wherein the control plane is configured to:

hold information from an access network about location and/or proximity of devices, and information about rules and/or policies for setting up sessions for the devices;

upon a particular device's request for session establishment, receive, via signaling, device related information directly from the access network;

based on the device related information that is received directly from the access network, perform selection of an abstract data plane node or a group of abstract data plane nodes; and provide the selected abstract data plane node or the selected group of abstract data plane nodes to a network controller; and the network controller implemented between the control plane and the data plane, wherein the network controller comprises an interface for collaborative operation with the control plane and is configured to select one or multiple data plane nodes that are suitable to act as policy enforcement points for enforcing rules in the data plane that are for enabling connectivity for the particular device based on the particular device's request for session establishment and the selected abstract data plane node or the selected group of abstract data plane nodes.

* * * * *